May 23, 1950 M. M. BRANDEGEE 2,508,989
APPARATUS FOR PURIFYING GASES
Filed Dec. 31, 1946 2 Sheets-Sheet 2

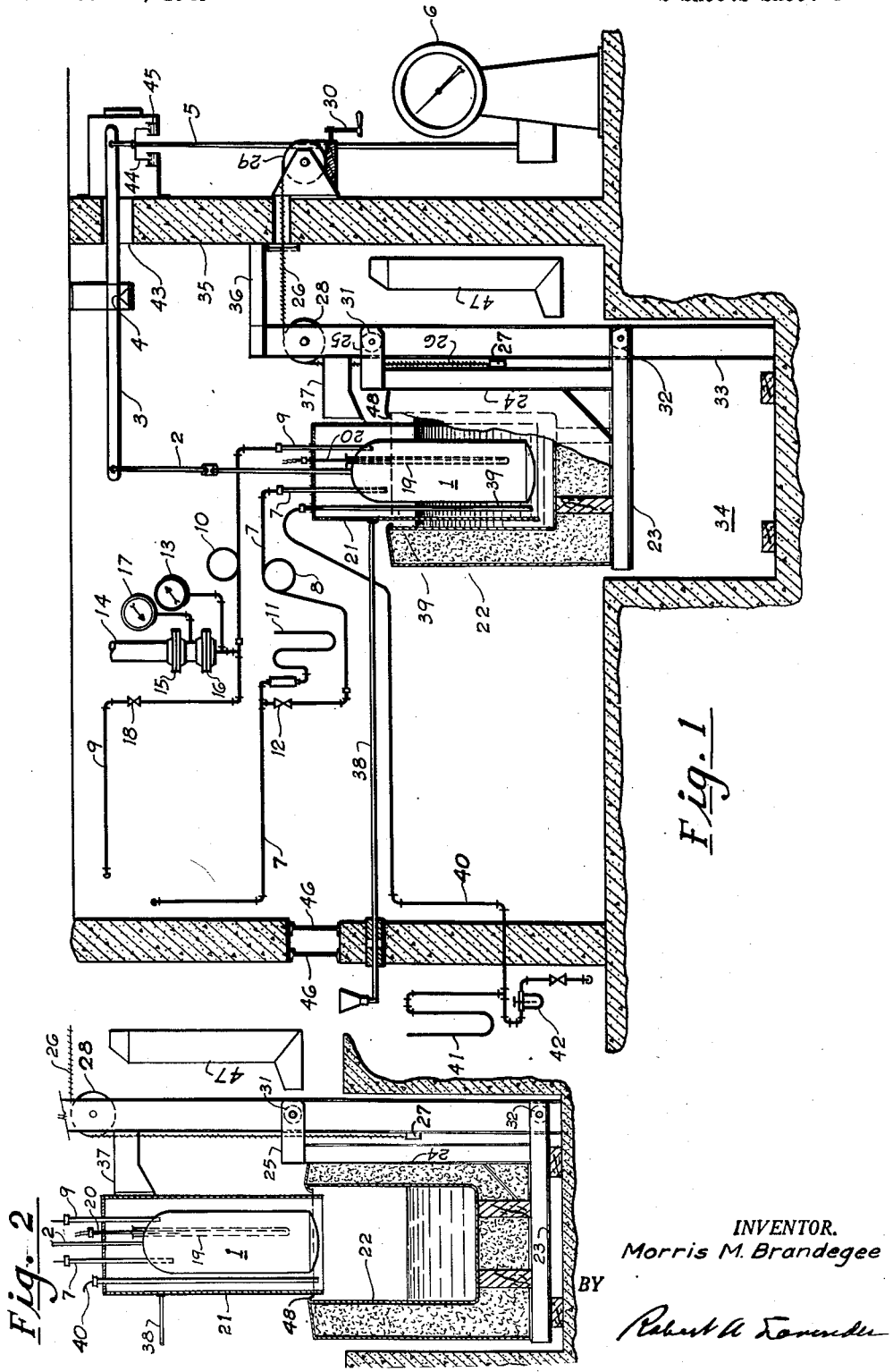

INVENTOR.
Morris M. Brandegee
BY
ATTORNEY

Patented May 23, 1950

2,508,989

UNITED STATES PATENT OFFICE 2,508,989

APPARATUS FOR PURIFYING GASES

Morris M. Brandegee, Lewiston, N. Y., assignor to the United States of America as represented by the United States Atomic Energy Commission Application December 31, 1946, Serial No. 719,375

4 Claims. (Cl. 62—122)

This invention relates to a method of and apparatus for purifying gases, and more particularly to a method of and apparatus for liquifying and purifying highly reactive gases while avoiding the accumulation of frost on certain parts of the apparatus employed.

Corrosive gases such as sulfur dioxide, the halogens, for example, chlorine and fluorine and compounds thereof such as hydrogen fluoride and the like are often employed in industrial processes under such conditions as require a high state of purity. In addition, in numerous instances, gases of this type are stored in a liquefied form in order to conserve space and, in some cases, in order to utilize the pressure differential between the storage space and the atmosphere to convey the gas to its destination.

Generally speaking, the various industrial processes for the production of corrosive gases of the type described above fail to produce a gas of sufficiently high purity for use in certain fields and hence the gas must be subjected to purification prior to utilization.

For example, gaseous halogens such as fluorine and chlorine are generated in electrolytic cells and are discharged at very low pressures. These electrolytically generated gases frequently contain impurities which must be removed before the gas can be utilized in various chemical processes.

For instance, one of the most widely employed methods of producing fluorine is that involving the electrolysis of an aqueous solution containing a ratio of about one mole of potassium fluoride to about two moles of hydrogen fluoride. The electrolysis is conducted by immersing carbon electrodes in the solution and passing a current therethrough. Fluorine is generated at the anode and hydrogen is generated at the cathode. The fluorine produced as a result of such a process is generally contaminated with certain impurities which result from the process. For example, the fluorine gas emitting from the cell generally contains as an impurity up to about 2% of oxygen which results from the electrolysis of water. Another impurity which is present in the fluorine is hydrogen fluoride which, because of its high vapor pressure, is also emitted from the cell. Generally, hydrogen fluoride is present in amounts of from about one to three percent by weight of the gas. Other impurities which may be present are minor amounts of nitrogen from the air which may diffuse into the system and traces of fluocarbons which may be produced as a result of a reaction between the fluorine and carbon of the electrodes.

It, therefore, became desirable to employ a method of and apparatus for purifying corrosive gases such as fluorine which are to be employed under conditions such that impurities of the type described above cannot be tolerated in any substantial quantity. Among the methods of purification which are particularly desirable is that involving liquefaction of the contaminated gas followed by selective vaporization. This means of purifying the contaminated gas is readily adaptable to corrosive gases such as fluorine since there is sufficient difference in the boiling points between the purified fluorine and the contaminating impurities to enable separation by means of selective vaporization. Furthermore, such a system is highly desirable for use in those instances wherein the gas is stored under a sufficiently high pressure to provide pressure flow to the various parts of the process in which it is to be utilized. It can be seen, therefore, that purification by liquefaction and selective vaporization is a most desirable means for removing impurities from corrosive gases under these conditions in that the contaminated gas may be maintained in liquefied form and purified just prior to passage into the process in which it is to be utilized.

In the selection of a method of and apparatus for performing the above-mentioned purification of corrosive gases by means of liquefaction and selective vaporization, a number of experimental systems were designed and tested. Due to the highly corrosive and toxic nature of the gases described above, normal mechanical means were unsuitable among other reasons in that they would not sustain continuous operation over a long period of time. After numerous methods and types of apparatus were tested with little or no success in achieving the required standards of continuous, reliable operation, a method and apparatus were devised which eliminated any exposure of moving mechanical parts to the gas. This system incorporates an apparatus for liquefaction and compression of highly reactive gases, by cooling at substantially atmospheric pressure in a pressure-tight container and afterward allowing the temperature to rise. The cooling is by heat transfer through the walls of the container, to cause evaporation of an inert, low boiling liquid, which may have been liquefied by cooling under high pressure. An example of a highly reactive gas is fluorine. An example of an inert low boiling liquid is liquid nitrogen. The invention, will be described as exemplified by the liquefaction of fluorine, which boils at $-187°$ C., by heat transfer to liquid nitrogen, which boils at $-195°$ C.

Gas is fed to the container. The container is immersed in a liquid refrigerant causing the gas therein to liquefy and creating a vacuum in the container. The refrigerant is removed and the subsequent warming up of the container vaporizes the liquid gas. Where the gas has a different boiling point than the impurities, it may be removed from the container to storage facilities in the form of a purified gas.

In the operation of the above-described system, considerable difficulty was presented by the accumulation of frost on the outside surface of the container after the liquid refrigerant bath was lowered away. Obviously the amount of frost accumulated on the container would be impossible to determine accurately and therefore a correction factor could not be calculated and employed when a reading was being taken on the weight scale from which the container was suspended. Since no accurate correction factor could be obtained, this accumulation of frost would render the weight scale reading inaccurate and hence the operation of such a purification system would be greatly impaired, particularly in those cases wherein a high degree of purity was required.

Applicant with a knowledge of all of these defects in and objections to the prior art has for an object of his invention the provision of an apparatus for purifying corrosive gases by liquefaction and selective evaporation wherein the volume of such liquid under treatment may be continuously and accurately determined.

It is a further object of this invention to provide a means to prevent the accumulation of frost on the external surface of the gas containing vessel in an apparatus for purifying corrosive gases involving liquefaction and selective vaporization.

Still another object of this invention is to provide an apparatus for the purification of corrosive gases of such design as to prevent air from directly contacting the external surface of the gas-containing vessel.

Still another object of the invention is to provide a simplified apparatus for the purification of corrosive gases of such design as to prevent the accumulation of frost on the external surface of the gas container.

Still another object of this invention is to provide an apparatus which may be readily constructed and is of such a design as to cause the gas container to be bathed in refrigerant vapor.

These and other objects of my invention will become apparent to the skilled worker in the art upon becoming familiar with the following description when taken in connection with the accompanying drawings.

Fig. 1 is an elevational view of an apparatus suitable for my purpose.

Fig. 2 is an elevational view of a portion of the same apparatus, with certain moveable parts in alternative position.

Figure 3:
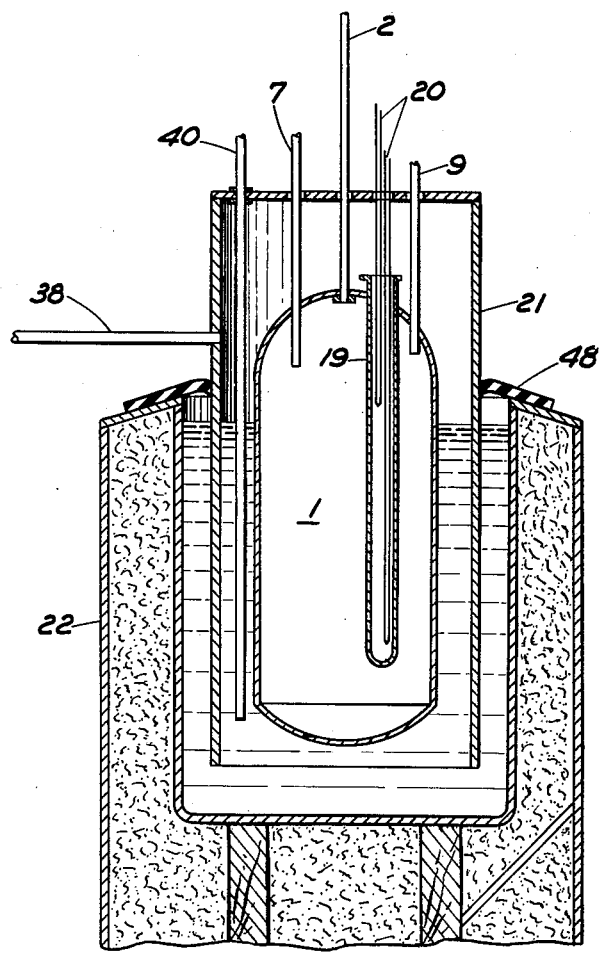
Fig. 3 is an exaggerated view of a portion of the same apparatus showing the relation of the seal to the pot and shell, and indicating the clearance openings for the escape of vapors.

Referring to the drawings in detail, 1 is a cylindrical, pressure-tight container suitable for holding the reactive gas, as such or as liquid. Container 1 is suspended by rod 2 from one arm of beam 3, fulcrumed at 4 and connected by its other arm through rod 5 to scale 6. Scale 6 is preferably weighted so as to overbalance the weight of container 1 and its contents, the weight of which is therefore subtracted from the reading of scale 6. Pipe 7, provided for flexibility with coil 8, is connected to container 1 for admission of the gas to be liquefied, from a source not shown. Pipe 9, provided for flexibility with coil 10, is connected to container 1 for withdrawal of the gas therefrom, under the vapor pressure of its liquid, to a high pressure storage, not shown. Pipe 7 is provided with monometer 11 and valve 12 for control of admission of the gas. Pipe 9 is provided with gauge 13, and vent pipe 14, which is closed by two frangible discs, 15 and 16. Between the two frangible discs, gauge 17 is connected to the vent pipe, in order to detect any leakage past disc 15. Pipe 9 is also provided with valve 18, for control of discharge of the gas from container 1. Container 1 is also provided with well 19, in which preferably two thermocouples 20 are inserted for the purpose of indicating the temperature within the container, and also checking the liquid level, in a manner to be hereinafter described.

Container 1 is enclosed in a vertical cylindrical shell 21, which is open at its bottom. Rod 2, pipes 7 and 9 and thermocouples 20 enter shell 21 through clearance openings in its upper end. Shell 21 preferably extends for a short distance below the bottom of container 1. Enclosing shell 21 and container 1, is heat insulated pot 22, adapted to contain liquid nitrogen. The annular flange 48 at the mouth of the pot cooperates with and is in close relation to the shell 21 to provide an effective seal.

When pot 22, in the position illustrated in Fig. 1, is filled with liquid nitrogen, container 1 and shell 21 are partially immersed therein. Pot 22 is however carried in a movable cradle comprising platform 23 and pairs of spaced frame members 24 and 25. The weight of pot 22, with its contents, platform 23 and members 24 and 25, are supported by one cable 26, which is attached to frame members 24 by a cross member 27 bridging them. Cable 26 is carried over pulley 28 and wound around drum 29, which is adapted to be rotated by crank 30 through the usual worm gear arrangement. The pot and cradle assembly, not being suspended from a point above their center of gravity, have a turning moment about the point of suspension 27, which is opposed by a couple set up by pressure of rollers 31 and 32 against the inner and outer flanges, respectively, of spaced I beam struts 33. Struts 33 are supported at their lower ends from the floor of pit 34 and at their upper ends from wall 35, by means of member 36. Pulley 28 is pivotally carried by the uper portions of struts 33. Shell 21 is rigidly supported from struts 33 by means of bracket 37 which bridges them. Pipe 38 is connected to the side of shell 21 for introduction of liquid nitrogen from a source not shown, such as a pressure cylinder, into pot 22, through the annular space between shell 21 and container 1. By turning the crank 30, it is therefore possible to lower the assembly comprising the pot 22 and its supporting cradle into pit 34, thereby in effect withdrawing container 1 and shell 21 from immersion in the liquid nitrogen in pot 22.

The lower position of the pot and cradle assembly is illustrated in Fig. 2. It will be seen that in this position the lower end of shell 21 telescopes inside the mouth of pot 22. Thus, the nitrogen vapor, which continues to rise from pot 22 while it is in the lower position, passes upward into the annular space between shell 21 and container 1.

This is an important feature of my invention, for the following reason:

As above indicated, container 1 is suspended within shell 21 by mechanism that causes variations in its weight to register upon scale 6, and as the weight increases by accumulation of liquid therein, the increase can be measured. The scale reading being known with the container empty, both when it is immersed in liquid nitrogen in the pot, and when the pot is lowered away, the weight of the liquid contents of the container can be ascertained at any moment. Now it should be remembered that at the moment of lowering the pot away from the container, the container is exceedingly cold; and if exposed to the atmosphere it would quickly pick up a coating of ice, which would completely falsify the reading of the scale, as an indication of the weight of the liquid in the container. However, by the construction and arrangement of parts described and illustrated, the nitrogen vapor rising in the annular space between the pot and shell, escapes through the openings in the top of the shell, through which the pipes 7 and 9, thermocouples 20, and rod 2 pass. These openings, being quite small, cause a slight superatmospheric pressure to be built up in this space. This effectually prevents entry of air and pick up of ice.

Other details of the invention are as follows:

When pot 22 is in the raised or operative position, it is necessary to maintain the liquid nitrogen in it at a constant predetermined level, otherwise the reading of the scale would be inaccurate. For this purpose it is necessary to provide a liquid-depth gauge. This is done by means of open ended pipe 39 passing down through a clearance opening in the upper end of shell 21, and which dips into the liquid nitrogen to a level near the bottom of pot 22. Pipe 39 is connected by pipe 40 to manometer 41. The liquid nitrogen which would otherwise fill pipe 39 is expelled therefrom by bubbling gaseous nitrogen, from a source not shown, into pipe 40, through liquid in bottle 42. Thus the reading of the manometer 41 gives an indication of the level of liquid nitrogen in pipe 39 above the open lower end thereof, and the level of liquid nitrogen in pot 22 can be held constant during the filling of container 1.

Since fluorine is an exceedingly dangerous gas, the apparatus is preferably housed within a gas-tight chamber. With this object in view, beam 3 is carried outward through opening 43 in wall 35 and rod 5 is provided with sealing cap 44, which dips into a liquid inert to fluorine in cup 45. Also window 46 is provided, through which manometer 11 and gauges 13 and 17 can be read. Although in the figures these gauges are not located in front of the window 46, it is to be understood that the assembly of pipes and gauges is diagrammatic and that the gauges are intended to be located where visible through the window. Also, it is to be understood that the valves are provided with extension handles, to be operated from without the walls of the chamber. Vent duct 47 is provided, for clearing the room of any accumulation of fluorine, preparatory to entering it.

A further refinement of the apparatus may consist in using two thermocouples 20, instead of one. One of these is carried to a point near the bottom of well 19, where it is normally below the liquid level, when there is any liquid in the container. The other thermocouple terminates at a level near the top of well 19, where it is normally above the liquid level. In practice it is found that there is a temperature differential between the readings of these two thermocouples, which can be calibrated to show the level of the liquid in the container. This may be used as a check upon the reading of the scale. The leads from these thermocouples are of course carried outside the walls, where their readings can be taken in safety.

Container 1 is preferably made of nickel, which is highly resistant to fluorine and has a high tensile strength at low temperatures.

When pot 22 is lowered, notwithstanding the fact that container 1 is bathed in cold nitrogen vapor, its liquid contents will evaporate and develop a pressure under which the fluorine can be drawn off as a gas to pressure storage.

I claim:

1. An apparatus for purifying gases which comprises a weighing scale, a container suspended from said weighing scale, means for introducing a gas into said container, means for removing a gas from said container, a refrigerant bath, means for periodically immersing said container in said refrigerant bath, and a shield surrounding said container and having one end thereof disposed in said refrigerant bath whereby to bathe said container in vapor from the refrigerant of said bath and prevent the ingress of moisture.

2. An apparatus for purifying a corrosive gas which comprises a weight scale, a container suspended from said weight scale for immersion in a liquid refrigerant bath, an elevator, a liquid refrigerant bath carried by the elevator, means surrounding said container for shielding said container from the atmosphere after separating said refrigerant bath therefrom, and means for feeding gases to and selectively exhausting them from said container.

3. An apparatus for purifying an electrolytically generated contaminated corrosive gas which comprises a gas container, means for admitting said electrolytically generated contaminated corrosive gas to said gas container, means for discharging said gas from said container after purification therein, a liquid refrigerant bath disposed beneath said container and capable of receiving said container, means for immersing said container in said bath, and a moisture shield surrounding said container and telescoped within the upper wall of said liquid refrigerant bath, and means for weighing the container and its contents.

4. In an apparatus for the purification of a corrosive gas which comprises a container for said gas suspended from the beam of a scale, means for admitting said gas to said container, means for discharging said gas from said container after purification therein, a liquid refrigerant bath disposed beneath said container and capable of receiving said container, means for raising and lowering said bath for periodically bringing it into contact with said container, and a moisture shield positioned around said container and so disposed as to form an annular channel with the upper wall of said bath whereby to provide an inclosure for vapor from said liquid refrigerant to bathe said container and prevent the condensation of moisture from the surrounding atmosphere thereon when said bath is removed therefrom.

MORRIS M. BRANDEGEE.

(References on following page)

REFERENCES CITED

The following references are of record in the file of this patent:

UNITED STATES PATENTS

| Number | Name | Date |
|---|---|---|
| 668,197 | Le Sueur | Feb. 19, 1901 |
| 1,454,756 | Mennell | May 8, 1923 |
| 1,680,873 | Girardville | Aug. 14, 1928 |
| 1,845,247 | Davidson | Feb. 16, 1932 |
| 2,023,164 | Cady | Dec. 3, 1935 |
| 2,246,563 | Winters | June 24, 1941 |

OTHER REFERENCES

Esbach, O. W.: Handbook of Engineering Fundamentals, 1936.

The Separation of Gases, M. Ruhemann, 1940, Oxford University Press, page 235.